(12) United States Patent
Smith et al.

(10) Patent No.: US 12,164,044 B2
(45) Date of Patent: Dec. 10, 2024

(54) ANGLE OF ARRIVAL OF PERSONAL AREA NETWORK DEVICES USING A SWITCHED BEAM ANTENNA

(71) Applicant: SR Technologies, Inc., Sunrise, FL (US)

(72) Inventors: Graham K. Smith, Boca Raton, FL (US); Ryan Busser, Fort Lauderdale, FL (US); Joaquin Prendes, Plantation, FL (US); Nikolaos Glantzis, Coconut Creek, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 18/416,483

(22) Filed: Jan. 18, 2024

(65) Prior Publication Data
US 2024/0302476 A1 Sep. 12, 2024

Related U.S. Application Data

(60) Provisional application No. 63/489,073, filed on Mar. 8, 2023.

(51) Int. Cl.
*G01S 3/04* (2006.01)
*G01S 3/12* (2006.01)
*G01S 3/46* (2006.01)
G01S 3/48 (2006.01)
G01S 3/50 (2006.01)

(52) U.S. Cl.
CPC ............... *G01S 3/043* (2013.01); *G01S 3/12* (2013.01); *G01S 3/46* (2013.01); G01S 3/48 (2013.01); G01S 3/50 (2013.01)

(58) Field of Classification Search
CPC ..... G01S 3/043; G01S 3/12; G01S 3/46; G01S 3/48; G01S 3/50
USPC .................................................. 342/417, 350
See application file for complete search history.

(56) References Cited

U.S. PATENT DOCUMENTS

| | | | |
|---|---|---|---|
| 6,438,389 B1 * | 8/2002 | Sandhu | H04B 7/086 370/332 |
| 10,085,232 B2 * | 9/2018 | Agiwal | H04W 68/00 |
| 10,314,007 B2 * | 6/2019 | Agiwal | H04W 68/00 |

(Continued)

FOREIGN PATENT DOCUMENTS

| WO | WO-2021211260 A1 * | 10/2021 | ........... H04B 17/318 |
|---|---|---|---|

OTHER PUBLICATIONS

Marquess, K., et al.; Specification of the Bluetooth® System, Covered Core Package Version: 5.0, Dec. 6, 2016; consisting of 2,822 pages.

*Primary Examiner* — Chuong P Nguyen
(74) *Attorney, Agent, or Firm* — Goodwin Procter LLP

(57) ABSTRACT

A method and apparatus for measuring the angle of arrival AOA of Classic Bluetooth Basic Rate (BR) packets, using a switched beam antenna SBA is described. Paging packets are transmitted and wide antenna beams, quadrants, are selected in turn until the paging response is received. After transmitting the synchronization packet and the temporary connection is established, narrow antenna beams are selected, in sequences and the average signal strength for each beam is recorded, for each sequence. The beam with the highest signal strength is returned as the AOA. Based upon which beam recorded the highest signal strength, the next sequence of antenna beams is selected.

22 Claims, 13 Drawing Sheets

(56) References Cited

U.S. PATENT DOCUMENTS

| | | | | |
|---|---|---|---|---|
| 10,732,253 B2* | 8/2020 | Smith | ................... | H01Q 21/065 |
| 10,771,927 B1 | 9/2020 | Prendes et al. | | |
| 10,877,126 B2* | 12/2020 | Zhang | ....................... | G01S 3/46 |
| 10,892,814 B2* | 1/2021 | Solichien | ............. | H04B 17/336 |
| 11,184,877 B2* | 11/2021 | Deng | .................. | H04W 68/025 |
| 11,442,131 B2* | 9/2022 | Al-kadi | ..................... | G01S 3/28 |
| 11,622,341 B2 | 4/2023 | Smith et al. | | |
| 11,711,134 B2* | 7/2023 | Hsieh | ................. | H04B 7/18515 |
| | | | | 375/347 |
| 11,716,704 B2* | 8/2023 | Deng | .................. | H04W 68/025 |
| | | | | 455/458 |
| 2018/0038934 A1* | 2/2018 | Passler | ...................... | G01S 5/04 |
| 2018/0267131 A1* | 9/2018 | Simileysky | ........... | H04W 4/026 |

\* cited by examiner

RX/TX cycle of master transceiver in normal mode for single-slot packets

RX/TX cycle of slave transceiver in normal mode for single-slot packets

| Step | Message | Packet Type | Direction | Hopping Sequence | Access Code and Clock |
|---|---|---|---|---|---|
| 1 | Page | ID | Master to Slave | Page | Slave |
| 2 | First slave page response | ID | Slave to Master | Page Response | Slave |
| 3 | Master page response | FHS | Master to Slave | Page | Slave |
| 4 | Second slave page response | ID | Slave to Master | Page response | Slave |
| 5 | 1st packet master | POLL | Master to Slave | Channel | Master |
| 6 | 1st packet slave | Any type | Slave to Master | Channel | Master |

601 — row 1
602 — row 2
603 — row 3
604 — row 4
605 — row 5
606 — row 6

*FIG. 6*

Messaging at initial connection when slave responds to first page message.

Messaging at initial connection when slave responds to second page message.

ANGLE OF ARRIVAL OF PERSONAL AREA NETWORK DEVICES USING A SWITCHED BEAM ANTENNA

CROSS-REFERENCE TO RELATED APPLICATION

This application is related to and claims priority to U.S. Provisional Patent Application Ser. No. 63/489,073, filed Mar. 8, 2023, entitled ANGLE OF ARRIVAL OF PERSONAL AREA NETWORK DEVICES USING A SWITCHED BEAM ANTENNA, the entirety of which is incorporated herein by reference.

TECHNICAL FIELD

The present disclosure relates to wireless communications, and in particular to methods and devices for angle of arrival measurement for Classic Bluetooth Basic Rate (BR) devices.

BACKGROUND

The Bluetooth system is specified in "Specification of the Bluetooth® System, Covered Core Package Version: 5.0, Publication Date: Dec. 6, 2016 ("Specification of the Bluetooth® System"). Bluetooth operates in the unlicensed Industrial, Scientific, and Medical (ISM) band from 2.400 to 2.4835 GHz. Classic Bluetooth Basic Rate (BR) employs Gaussian Frequency-Shift Keying (GFSK) as the primary modulation scheme, while Classic Bluetooth Enhanced Data Rate (EDR) incorporates differential phase-shift keying (DPSK) for increased throughput. BR may occupy any of 79 radio frequency (RF) channels, spaced by 1 MHz. The nominal channel symbol rate is 1 MHz, with a nominal channel symbol duration of 1 μs.

A more complete understanding of the present embodiments, and the attendant advantages and features thereof, will be more readily understood by first describing relevant Bluetooth® SR system details. Relevant details of the Bluetooth® system are therefore presented herein. A more complete description may be obtained by reference to the Specification of the Bluetooth® System, the entirety of which is incorporated herein by reference.

Bluetooth® is a time division multiplex (TDM) system that includes a "Master" device, which initiates an exchange of data, and a "Slave" device which responds to the Master. The TDM slot duration is 625 s, and the maximum payload length is such that certain packet types may extend up to five slots in length. Each device will hop to an RF channel once per packet and Slave devices will utilize the timing of their Master to hop in synchronization.

There are two basic types of data packets and links: Asynchronous Connectionless (ACL) and Synchronous Connection Oriented (SCO). ACL is used for data communications with just one ACL link per device pair. SCO is used for real time audio links, and each device may support up to 3 SCO links at one time.

FIG. 1 is a diagram of a typical receive/transmit (RX/TX) cycle for the Master transceiver in normal mode for single-slot packets. Each TX slot and RX slot is of duration 625 μs. The Master transceiver transmits packet 140 in TX slot 110 on hop channel f(k) and then listens on RX slot 120, on hop channel f(k+1). The Master then transmits in the next slot 130 on hop channel f(k+2). The time between consecutive TX slots and RX slots is therefore 1250 μs. FIG. 2 is a diagram of the typical corresponding RX/TX cycle of the Slave transceiver. The Slave transceiver receives during slot 210, on hop channel f(k) and transmits on hop channel f(k+1) 220. The duration of the transmitted packet 140 is less than or equal to 426 μs. The Bluetooth® physical channel is characterized by the combination of a pseudo-random frequency hopping sequence, the specific slot timing of the transmissions, the access code and the packet header encoding. The basic piconet channel is used for communication between connected devices and is characterized by a unique pseudo-random frequency hopping sequence determined by the Bluetooth clock of the Master.

FIG. 3 is a diagram that shows the format of the unique Bluetooth Device Address (BD_ADDR) 300. The BD_ADDR 300 is split into three parts, lower address part (LAP) 310, upper address part (UAP) 320, and non-significant address part (NAP) 330. In order to establish a connection to a Bluetooth® device only the UAP and LAP are required. The NAP is informative, and devices often use a default NAP to establish connectivity.

FIG. 4 is a diagram that shows the general format for the Classic Bluetooth BR packet type. Every packet starts with an Access Code 410. If a packet header follows, the access code is 72 bits long, otherwise the access code is 68 bits long and is known as a shortened access code. For any packet not included solely of a shortened Access Code, the Access Code is followed by a 54-bit GFSK Packet Header 415, which is generated by encoding an 18-bit information field using a rate ⅓ repetition code. The Header is followed by the payload 420.

FIG. 5 is a diagram showing the Access Code 410 format. The Access Code 410 is used for synchronization and identification and identifies all packets exchanged on a physical channel. The Access Code 410 begins with a 4-bit preamble 510 (either 0101 or 1010), and, for non-shortened Access Codes, ends with a 4-bit trailer 520 (also either 0101 or 1010). The 4-bit preamble 510 is followed by Sync Word 515. Sync Word is a 64-bit code word derived from a 24-bit LAP. For device access codes (DAC), the Slave LAP is used, and for channel access codes (CAC), the Master LAP is used. An "ID" packet includes either the DAC or the CAC. The paging ID is the DAC, used during paging, and the ID used for all packets exchanged on the piconet physical channel is the DAC.

The default state of a Bluetooth® device is the Standby state. In this state, the device may be in a low-power mode. A device may leave the Standby state to scan for page or inquiry messages or to page or inquire itself. In order to establish new connections, the paging procedure or the synchronization scan procedure is used. Only the Bluetooth® device address, BD_ADDR 300, as discussed above with reference to FIG. 3, is required to set up a connection using the paging procedure. A device that establishes a connection using a page procedure will automatically become the Master of the connection.

An unconnected Bluetooth® device must periodically enter the page scan state. In this state, the device activates its receiver and listens for a Master device that might be trying to page it. During the page scan state, the unconnected device listens on one of 32 channels, for at least 10 ms (16 slots). In the general sense and as an example, a different channel is selected every 1.28 seconds (2048 slots). When commanded to enter the page state, the Master device starts to transmit, using 16 of the 32 channels being used by the paged device. During every even numbered slot it transmits two ID packets on two different channels, and during the following slot it listens on two different channels for the Slave's response (also an ID packet). In the next two slots it uses the next two channels, so the hopping sequence (of 16 channels) repeats every 10 ms (16 slots). The Master repeats the 16-slot sequence for at least long enough for the paged device to enter the page scan state, which in the general sense is 128 times, i.e., for at least 1.28 seconds. If the Master does not receive a response, it will then try the other 16 channels.

FIG. 6 is a table of the initial messaging between a Master and a Slave when a Master is paging a Slave. In step 1 601 the Master device transmits the page ID packet. In this example it is assumed that the page ID packet sent by the Master is received correctly by the Slave. On receiving the page ID, in step 2 602, the Slave device transmits a Slave page ID response (the ID is the Slave's device access code). In step 3 603 the Slave awaits the arrival of a Frequency Hopping Sequence (FHS) packet from the Master and if it is received, in step 4 604, then the Slave responds with a Slave page ID response message to acknowledge the reception of the FHS packet. During the initial message exchange, steps 1 to 4, 601 to 604, all parameters are derived from the Slave's device address, BD_ADDR, and that only the page hopping and page response hopping sequences are used (derived from the Slave's device address, BD_ADDR).

In step 5, 605, the Slave device enters the Connection state, and the Slave device uses the Master's clock and the Master's BD_ADDR to determine the basic channel hopping sequence and channel access code. The FHS packet in step 3, 603, contains all the information for the Slave to construct the channel access code. The connection mode starts with a Poll packet transmitted by the Master in step 5, 605, and the Slave, in step 6, 606, may reply with any type of packet but a Null packet is generally used for this response.

FIG. 7 is a diagram showing an example of the timing of the paging packets when the Slave 760 responds to the first page in a slot. When paging, the Master 750 sends two pages, i.e., IDs, in a slot spaced at 312.5 µs, which is half the slot time. In the first slot, step 1 701, the Master 750 sends two pages 710 and 711, on channels f(k) and f(k+1) respectively, and then listens in the next slot, step 2 702, in turn on channels f'(k) and f'(k+1). If, in step 1 701, the Slave 760 is listening on channel f(k), then in step 2 702, it sends a response packet 712 on channel f'(k). In the next slot, step 3 703, the Master 750 then sends an FHS packet 714 on channel f(k+1). In the next slot, step 4 704, the Slave 760 responds to the FHS packet 714 with a response packet 716 on channel f'(k+1). At this point, the paging sequence is complete and the Master 750 and Slave 760 both change to the basic channel hopping sequence as defined in the FHS packet 714. In step 5 705, the Master 750 transmits the first traffic packet 718 which is generally a Poll packet, and in step 6 706, the Slave 760 responds with a Null packet 720.

FIG. 8 is a diagram showing an example of the timing of the paging packets when the Slave 760 responds to the second page in a slot. In the first slot, step 1 701, the Master 750 sends two pages 710 and 711, on channels f(k) and f(k+1) respectively, and then listens in the next slot, step 2 702, in turn on channels f'(k) and f'(k+1). If, in step 1 701, the Slave 760 is listening on channel f(k+1), then in step 2 702, it sends a response ID packet 812 on channel f'(k+1). In the next slot, step 3 703, the Master 750 then sends an FHS packet 814 on channel f(k+2). In the next slot, step 4 704, the Slave 760 responds to the FHS packet 814 with a response packet 816 on channel f'(k+2). At this point, the paging sequence is complete and the Master 750 and Slave 760 both change to the basic channel hopping sequence as defined in the FHS packet 814. In step 5 705, the Master 750 transmits the first traffic packet 818 which is generally a Poll packet, and in step 6, the Slave 760 responds with a Null packet 820.

The nominal time between the page 710 and the response of 712, in FIG. 7, is one slot time, 625 µs. The nominal time between the page 711 and the response 812, in FIG. 8, is also one slot time, 625 µs, but the transmissions take place nominally 312.5 µs after the start of the slot. The respective FHS packets 714 and 814 are transmitted at the start of the slot, in step 3 703 and the nominal time between the FHS packets, 714 and 814, and the responses, 716 and 816, is again, nominally, one time slot, 625 µs.

The angle of arrival AOA of a signal may be measured using a switched beam antenna, SBA. A more complete understanding of the present embodiments, and the attendant advantages and features thereof, will be more readily understood by first describing the basics of an example SBA.

FIG. 9 is a block schematic diagram of an example of an SBA 900. In this example, SBA 900 includes 24 individual antennas 901 to 924. Each antenna 901 to 924 is connected to a radio frequency, RF, switch 931 to 954, respectively. The RF switches 931 to 954 are connected to an RF combiner/splitter 960 which is connected to a single RF connector 990. The RF switches 931 to 954 are controlled by the antenna switch selection module 970 over a data bus 975. External commands are sent via the communications connector 980 which is connected to the antenna switch selection module via data bus 985. External commands sent via communication connector 980 may cause one or more antennas 901 to 924 to be selected by causing the respective RF switch(es) 931 to 954 to be selected. For example, different commands may be used to either cause a single antenna to be selected in order to form a single narrow beam, or a selection of more than one antenna may be selected so as to form a wider beam.

FIG. 10 is a diagrammatic example of the 24 individual beams 1001 to 1024 corresponding to antennas 901 to 924 when arranged in a circle, each beam at 15 degrees intervals. By inputting the appropriate command at communications connector 980, any of the 24 individual beams may be selected. Also, by inputting other commands at communications connector 980, selections of antennas may be selected. FIG. 11 is a diagram of an example of a beam of about 90 degrees width, quadrant 1101, at a relative angle of 45 degrees, resulting from the selection of antennas 1002, 1004 and 1006. Similarly other quadrants 1102, 1103 and 1104 may be produced at relative angles of 135, −135 and −45 degrees by selecting the appropriate antennas. For example, quadrant 1102 is produced by selecting antennas 908, 910, and 912 (beams 1008, 1010 and 1012); quadrant 1103 is produced by selecting antennas 914, 914, 916, (beams 1014, 1016 and 1018); quadrant 1104 is produced by selecting antennas 920, 922, 924 (beams 1020, 1022 and 1024).

As discussed above with reference to FIGS. 6, 7 and 8, it may take up to 2.56 seconds for Master 750 and Slave 760 devices to enter the page state and for the FHS packet, step 3 603 in FIG. 6, to be sent by Master 750. As discussed above with reference to FIG. 6, the connection mode starts with a Poll packet transmitted by Master 750 in step 5 605. The connection time between the Master and Slave is a temporary one. Because of the relatively long gap between connections, any SBA beam selection process needs to be re-initialized each time after the relatively short connection time, as a permanent connection is not possible.

SUMMARY

Methods and devices for angle of arrival measurement for Classic Bluetooth Basic Rate (BR) devices are disclosed.

According to one aspect, a method is provide for using a switched beam antenna (SBA) implemented in a first wireless device for determining an angle of arrival (AOA) corresponding to communication between the first wireless device and a second wireless device. The method includes determining a first beam having a first width and a sector of beam coverage from which the first wireless device pages the second wireless device and a paging sequence is received, the sector of beam coverage of the first beam encompassing a plurality of second beams pointing in different directions, each second beam being narrower than the first beam. The method also includes transmitting in succession, on each of the second beams during a respective time duration, each transmission on the second beam including a sequence identifiable by the second wireless device. The method further includes, for each transmission on a second beam during the respective time duration: receiving packets from the second wireless device responsive to the identifiable sequence; and determining an average signal strength of the received packets during the respective time duration. The method also includes determining an AoA by selecting a second beam of the plurality of second beams that results in a highest average signal strength of the determined average signal strengths.

According to another aspect, a switched beam antenna, SBA, implemented in a first wireless device, is provided for determining an angle of arrival (AOA) corresponding to communication between the first wireless device and a second wireless device. The SBA includes processing circuitry configured to determine a first beam having a first width and a sector of beam coverage from which the first wireless device pages the second wireless device and a paging sequence is received, the sector of beam coverage of the first beam encompassing a plurality of second beams pointing in different directions, each second beam being narrower than the first beam. The SBA also includes a radio interface in communication with the processing circuitry and configured to: transmit in succession, on each of the second beams during a respective time duration, each transmission on the second beam including a sequence identifiable by the second wireless device; and for each second beam transmission, receive packets from the second wireless device responsive to the identifiable sequence during the respective time duration. The processing circuitry is further configured to: for each transmitted second beam, determine an average signal strength of the received packets during the respective time duration; and determine an AoA by selecting a second beam of the plurality of second beams that results in a highest average signal strength of the determined average signal strengths.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a table of the initial messaging between a Master and a Slave when a Master is paging a Slave;

DETAILED DESCRIPTION

This Application incorporates U.S. Pat. No. 10,771,927 B1 and U.S. patent application Ser. No. 17/723,864 by reference in their entireties.

A method and apparatus are disclosed using an SBA to determine the AOA of transmissions from a BR Bluetooth device. The default state of a Bluetooth device is the Standby state. In this state, the device may be in a low-power mode. As discussed above with reference to FIG. 6, a device may leave the Standby state to scan for page or inquiry messages or to page or inquire itself. In order to establish new connections, the paging procedure may be used. A device that establishes a connection using a page procedure will automatically become the Master 750 of the connection. In a Connection state, the connection has been established and packets may be sent back and forth, and the device uses the basic or adapted channel hopping sequence. A device may transition to the Connection state from the page/page scan substates and starts with a Poll packet, sent by the Master 750 that verifies the switch to the Master's timing and channel frequency hopping.

Figure 1:
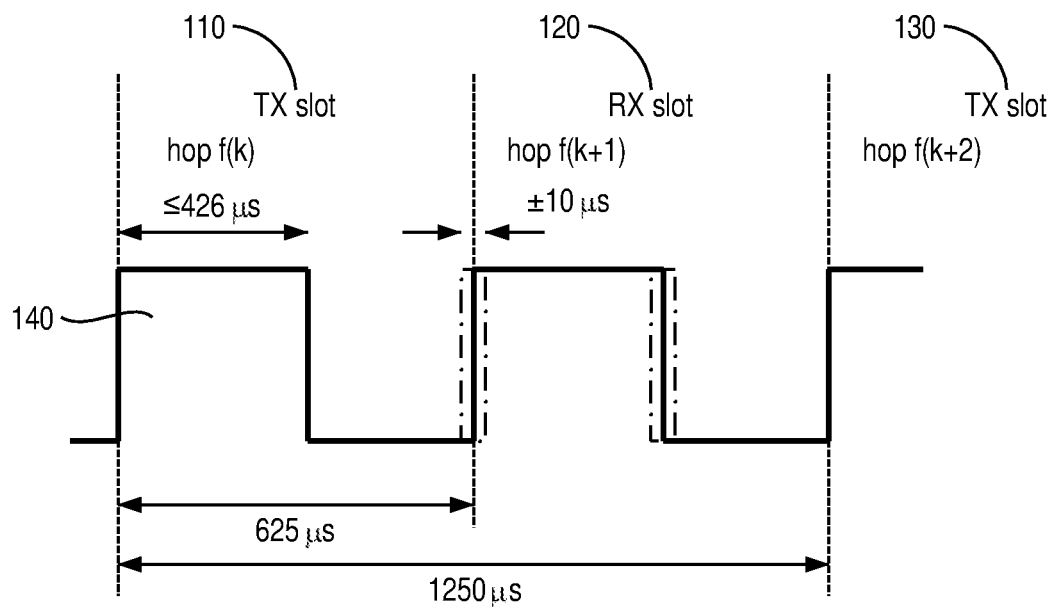
FIG. 1 is a diagram of a typical receive/transmit (RX/TX) cycle for the Master transceiver in normal mode for single-slot packets.
Figure 2:
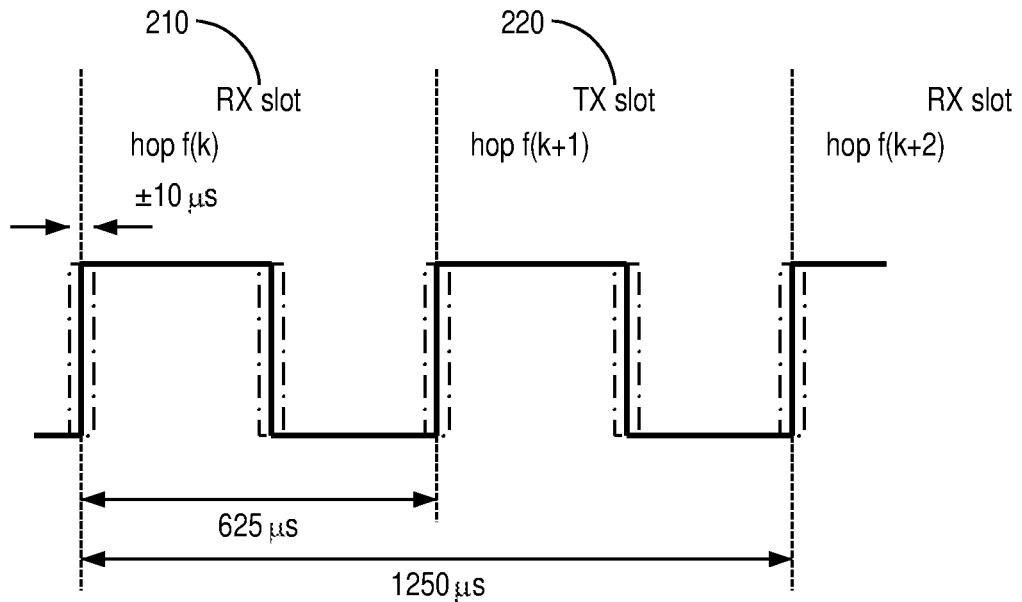
FIG. 2 is a diagram of the typical corresponding RX/TX cycle of the Slave transceiver.
Figure 3:
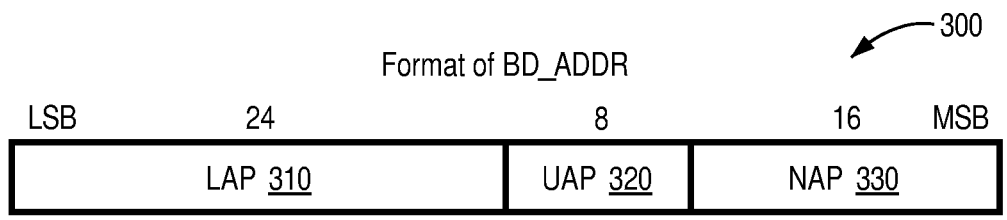
FIG. 3 is a diagram that shows the format of the unique Bluetooth Device Address (BD_ADDR)
Figure 4:
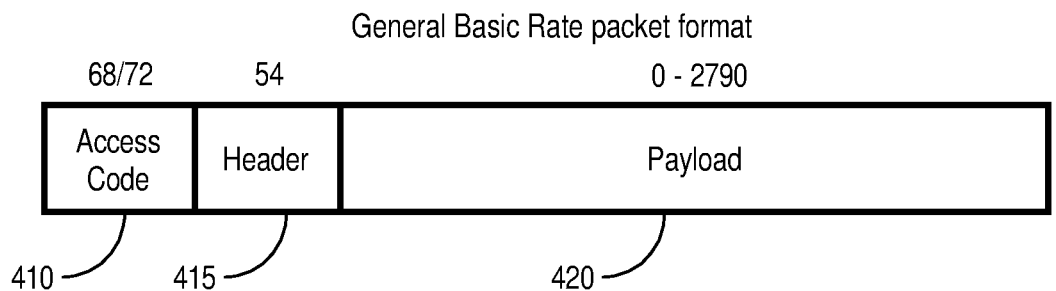
FIG. 4 is a diagram that shows the general format for the Classic Bluetooth BR packet type.
Figure 5:
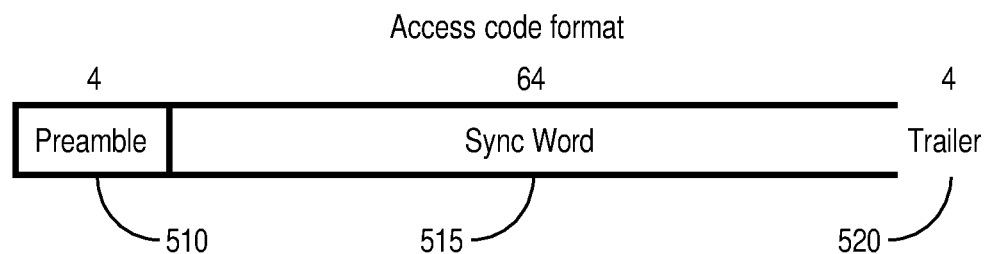
FIG. 5 is a diagram showing the Access Code format.
Figure 7:
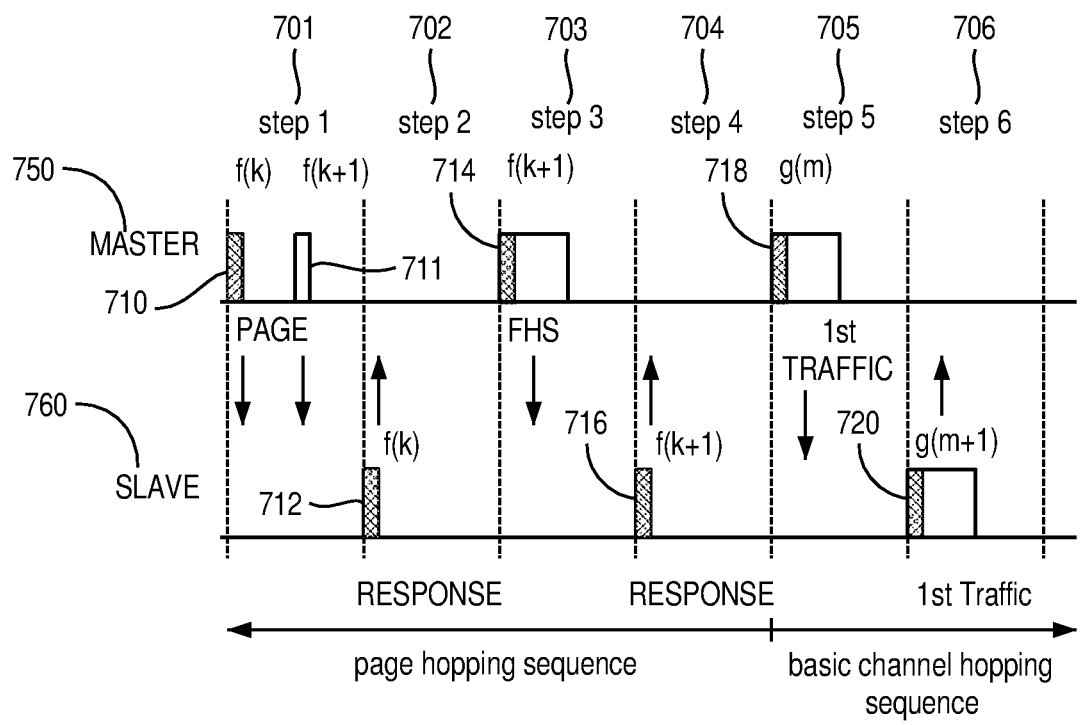
FIG. 7 is a diagram showing an example of the timing of the paging packets when the Slave responds to the first page in a slot.
Figure 8:
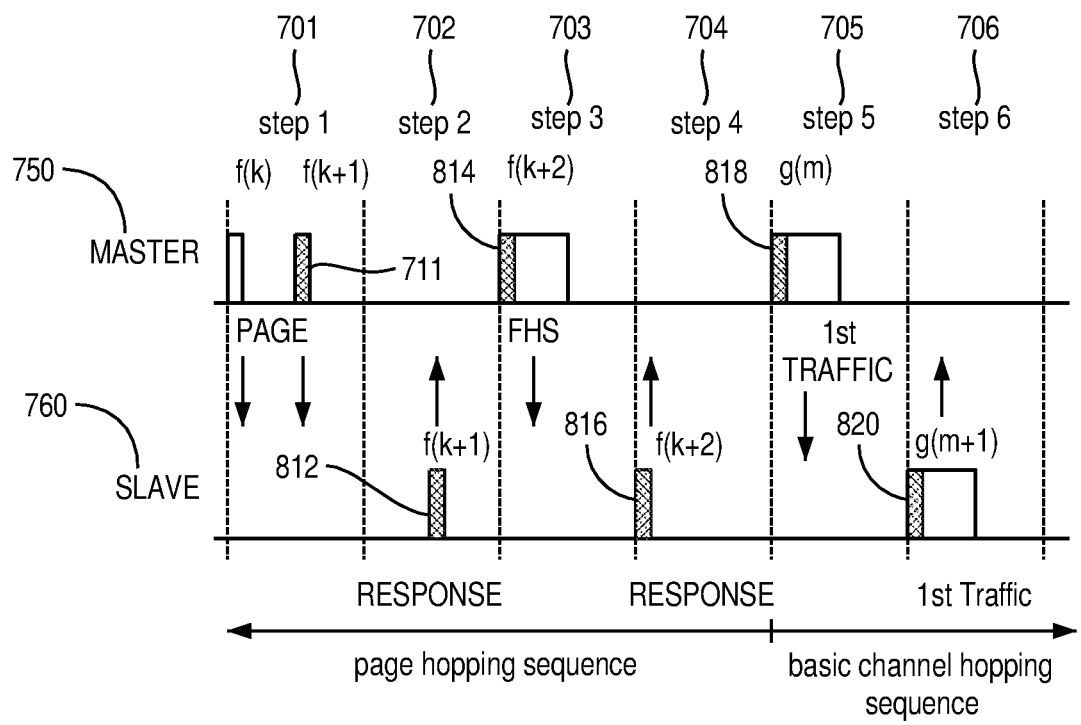
FIG. 8 is a diagram showing an example of the timing of the paging packets when the Slave responds to the second page in a slot.

As discussed above with reference to FIGS. 6, 7 and 8, an unconnected device will listen for at least 10 ms on one of 32 channels, then sleep for 1.25 seconds, and then listen on another channel for at least 10 ms. The unconnected device, Slave 760, will continue this pattern until it receives a page. In the paging state, the Master 750 first transmits on 16 of the 32 channels being used by the paged device, transmitting on two different channels in a slot and listening on two different channels for the Slave's 760 response in the next slot. Hence, every 10 ms, the Master 750 will transmit, and listen for a response, on each of 16 channels. The Master 750 repeats this 16-slot sequence a maximum of 128 times, i.e., for 1.28 seconds. If no response is received, then the Master 750 will repeat this sequence using the next set of 16 paging channels. Hence, a Master 750 should be able to page a Slave 760 in at most 2.56 seconds, and in general, a time of less than 1.28 seconds.

Once the paging is completed, a temporary connection for a BR device may be set up, for example using the method disclosed in U.S. Pat. No. 10,771,927 B1, and then a number of packets are exchanged. The number of exchanged packets is extended by the Master 750 setting up a link management protocol (LMP) Name Request connection after which the connection may disconnect; all without the need of any user participation at the Slave 760. During this exchange of packets, in order to maintain the channel hopping sequence and synchronization, in addition to the specific packets for the paging, connection and LMP Name Request exchanges, the Master 750 and the Slave 760 may transmit Poll packets and Null packets respectively and a Bluetooth protocol analyzer may be used to capture the Bluetooth packets. The duration of such a connection may vary but in general may be in the order of 200 ms with continuous packet exchanges, but with breaks in the communication that may have a duration of up to 2 to 5 seconds.

When using an SBA, as different antennas are selected to form beams, the corresponding average signal strengths of the received packets may be used to select the best antenna or beam. If using correlation to detect the received packets, (which may be accomplished using an arrangement such as is described in U.S. patent application Ser. No. 17/723,864), then the corresponding correlation values may be used. In the following disclosure, when referring to signal strength, it should be noted that this also encompasses the concept of the correlation value.

Figure 12:
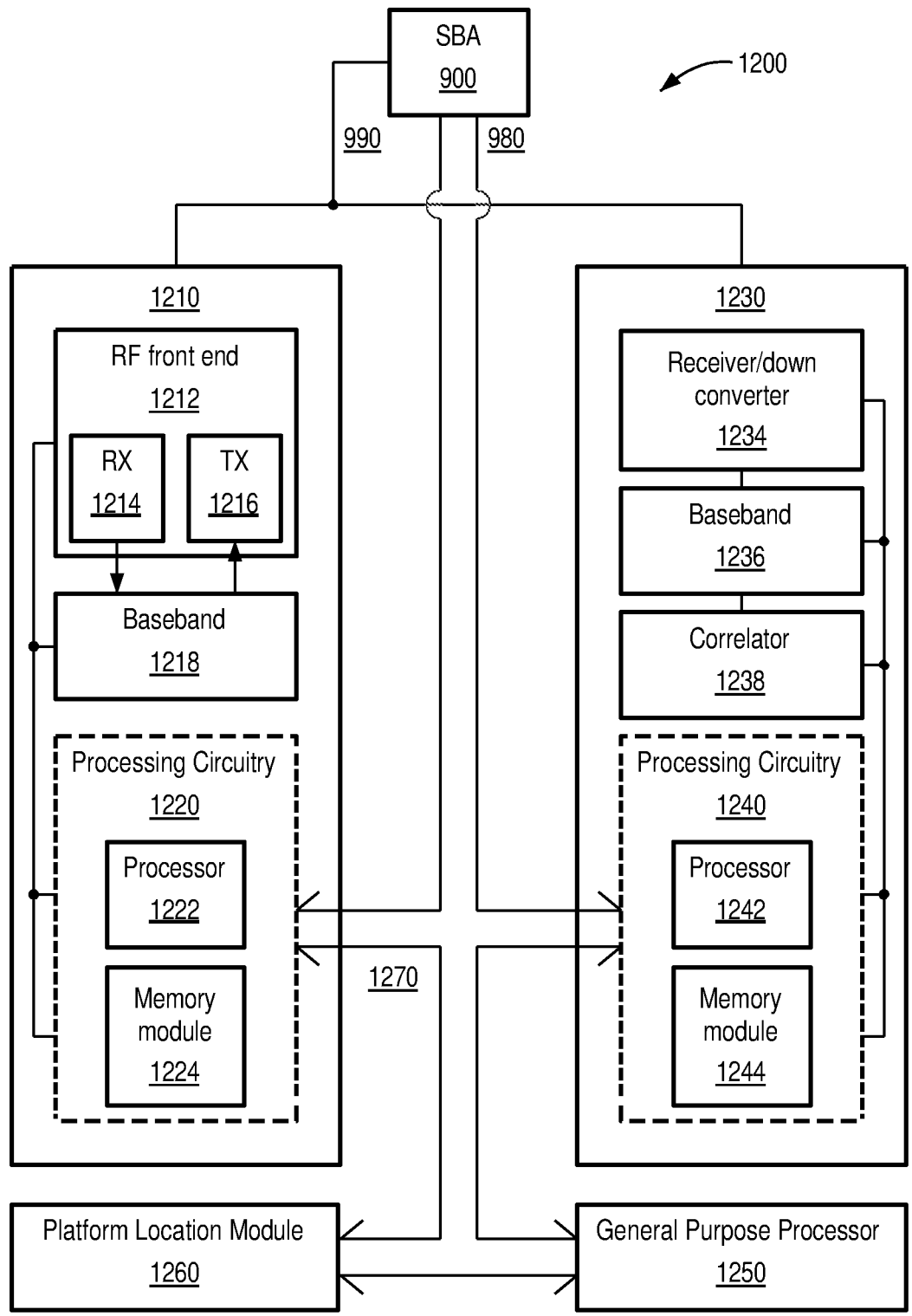
FIG. 12 illustrates a block diagram of an example wireless communication system which, according to an embodiment of the disclosure, may be configured to perform the functions described herein.

FIG. 12 illustrates a block diagram of an example wireless communication system 1200 which, according to an embodiment of the disclosure, may be configured to perform the functions described herein. Wireless communication system 1200 may be static or mobile. In some embodiments, the wireless communication system 1200 includes an SBA 900, a wireless transmitter/receiver 1210, that may be configured to wirelessly receive signals and transmit signals and may be configured to execute any of the methods of the Bluetooth Specification, and a wireless receiver 1230 that performs the functions of a Bluetooth receiver and Bluetooth protocol analyzer. Wireless communication system 1200 may perform the functions of the Master 750 as described herein. The wireless communication system 1200 may also include a general purpose processor 1250 and a platform location module 1260 which are interconnected to SBA 900, the wireless transmitter/receiver 1210 and wireless receiver 1230 by a data bus 1270. In some embodiments, the connection to the SBA 900 via communications connector 980 may be via a separate data bus from the processing circuitry that is used to control the SBA 900, i.e., processing circuitry 1220 or 1240 or the general purpose processor 1250.

In some embodiments, the wireless communications system 1200 includes wireless transmitter/receiver 1210. Wireless transmitter/receiver 1210 includes an RF front end 1212, which includes transmitter 1216 and receiver 1214, and baseband 1218. The transmitter 1216 may perform the functions of up conversion and amplification for the transmission, via SBA 900, of Bluetooth packets received from baseband 1218. Receiver 1214 may perform the functions of low noise amplification, filtering and frequency down conversion for Bluetooth packets, received via SBA 900, suitable for inputting to the baseband 1218. Baseband 1218 may perform the functions of modulation, de-modulating, whitening, de-whitening, coding, and de-coding as described in the Bluetooth Specification. In some embodiments, the processing circuitry 1220 and/or the processor 1222 may include integrated circuitry for processing and/or control, e.g., one or more processors and/or processor cores and/or Field Programmable Gate Arrays (FPGAs) and/or Application Specific Integrated Circuitry (ASICs) configured to execute programmatic software instructions. In some embodiments, some or all of the functions of the baseband 1218 may be performed by the processing circuitry 1220. The processing circuitry 1220 may be configured to control any of the methods and/or processes described herein and/or to cause such methods, and/or processes to be performed, e.g., by the baseband 1218 and the RF front end 1212. The memory module 1224 may be configured to store data, programmatic software code and/or other information described herein. In some embodiments, the software may include instructions that, when executed by the processing circuitry 1220, causes the processing circuitry 1220 to perform the processes described herein with respect to the wireless transmitter/receiver 1210.

In some embodiments, the wireless receiver 1230 includes a receiver/down converter 1234 and a baseband 1236, a correlator 1238, and processing circuitry 1240 that includes a processor 1242 and a memory module 1244. The receiver/down converter 1234 may perform the usual functions of an RF receiver front end such as low noise amplification, filtering, and frequency down conversion so as to condition the received signal suitable for inputting to the baseband 1236. The baseband 1236 may perform the functions of de-modulating, de-whitening, and de-coding as described in the Bluetooth Specification. In embodiments where a correlator 1238 is present, baseband 1236 may just perform the function of de-modulation of received signals suitable for inputting to the correlator 1238 and correlator 1238 may perform the function of correlation of the received signals with the expected wanted signals, as discussed in U.S. patent application Ser. No. 17/723,864. When the correlator 1238 is present, baseband 1236 does not perform the function of de-whitening the received signals as the correlator 1238 is correlating received packets that may have bit errors and de-whitening has the effect of increasing the number of bit errors. In some embodiments, the receiver/down converter 1234, the correlator 1238 and/or the processing circuitry 1240 may include integrated circuitry for processing and/or control, e.g., one or more processors and/or processor cores and/or FPGAs and/or ASICs configured to execute programmatic software instructions. In some embodiments, the functions of the RF baseband 1236 and/or the correlator 1238 may be performed by the processing circuitry 1240. The processing circuitry 1240 may be configured to control any of the methods and/or processes described herein and/or to cause such methods, and/or processes to be performed, e.g., by the receiver/down converter 1234, the baseband 1236 and the correlator 1238. The memory module 1244 is configured to store data, programmatic software code and/or other information described herein. In some embodiments, the software may include instructions that, when executed by the processing circuitry 1240, causes the processing circuitry 1240 to perform the processes described herein with respect to the wireless receiver 1230.

In some embodiments, the wireless transmitter/receiver 1210 may be configured to transmit and receive signals and the processing circuitry 1220 may be configured to prepare the transmitted and received signal attributes based upon the Bluetooth Specification. In some embodiments, the wireless transmitter/receiver 1210, acting as Master 750, may be configured to transmit packets for the purpose of paging another device, in particular Slave 760, as discussed above with reference to FIGS. 6, 7, and 8 and packets transmitted for the purpose of maintaining communications with another device, in particular Slave 760. Such packets may include ID, FHS, and Poll packets that are to be transmitted and received by a wireless station that is based upon the Bluetooth Specification. The memory module 1224 may store instructions for executing any method mentioned in the specification, input signals, and results of processing of the processor 1222, signals to be outputted and the like.

In some embodiments, the wireless receiver 1230 may be configured to receive the transmissions of wireless transmitter/receiver 1210 and another wireless communication devices, and the processing circuitry 1240 may be configured to monitor an attribute of the other wireless communication device, i.e., Slave 760, and determine the value of the received signal strength, or correlation value, of packets from the Slave 760. In addition, in some embodiments, the wireless receiver 1230 may be configured to record the setting of the SBA 900 corresponding to the transmission of packets from wireless transmitter/receiver 1210 and the reception of the response packets from Slave 760. In addition, in some embodiments, the wireless receiver 1230 may be configured to communicate to the wireless transmitter/receiver 1210, via the data bus 1270, the successful reception of transmissions from the Slave 760. Also, in some embodiments, the wireless transmitter/receiver 1210 may be configured to communicate to the receiver 1230 the channel frequency that the response packet is expected to be received on. Hence, wireless communications system 1200, acting as Master 750, may page a Slave 760, set up a communications channel, exchange Poll and Null packets and then terminate the communications, even, if the correlator 1238 is present, for the conditions where the response signals from the Slave 760 are at negative signal to noise ratios (SNRs).

In some embodiments, the receiver/down converter 1234, baseband 1236 and correlator 1238 may be located as part of wireless transmitter/receiver 1210 replacing receiver 1214, and wireless receiver 1230 may be omitted.

In some embodiments, a general purpose processor 1250 may be used to control the operations of the wireless communication system 1200 and in particular the RF (i.e., wireless) transmitter/receiver 1210, wireless receiver 1230, and SBA 900. The general purpose processor 1250 may also carry out the various calculations described herein and may also prepare the measurement results for disclosure to an operator or user. In some embodiments, the general purpose processor 1250 may be a computing device such as a tablet computer, desktop computer, laptop computer, or distributed computing, e.g., cloud computing. In some embodiments, the general purpose processor 1250 may be a processor/CPU in the tablet, laptop computer, desktop computer, or distributed computing environment, etc. In some embodiments, the general purpose processor 1250 may include integrated circuitry for processing and/or control, e.g., one or more processors and/or processor cores and/or FPGAs and/or ASICs configured to execute programmatic software instructions and may include a memory module to execute programmatic code stored in the general purpose processor or another device. It is also noted that the elements of the wireless communications system 1200 may be included in a single physical device/housing or may be distributed among several different physical devices/housings. General purpose processor 1250 may be used to perform the various calculations as described in this disclosure and may also prepare the measurement results for disclosure to an operator or user.

In some embodiments, a platform location module 1260 may be used to input, via the data bus 1270, to the general purpose processor 1250 and/or the processing circuitry 1240 and/or 1220 the location of the platform that is carrying the wireless communication system 1200. The platform location module 1260 may include navigation equipment such as a GPS receiver and/or a gyro and may provide both the location and heading of the wireless communication system 1200 to the general purpose processor 1250, and processing circuitries 1220 and 1240. The location and heading of the wireless communication system 1200, together with the antenna selections of the SBA 900 may be used by the general purpose processor 1250 to calculate and display the location of the Slave 760. Geo-location of a device using AOAs and location of the wireless communication device is known.

A more complete understanding of the present embodiments, and the attendant advantages and features thereof, will be more readily understood by first describing a method of controlling the SBA 900 antenna selection, the transmission and reception of the paging and communication packets between Master 750 and Slave 760, and the measurement of the received signals at Master 750.

As discussed above with reference to FIGS. 6, 7 and 8, Master 750 should receive a page response from Slave 760 within a period of 2.56 seconds maximum, but in general, less than 1.28 seconds.

In order to transmit a paging signal and receive the corresponding response successfully, the SBA 900 antenna or beam should be pointed in the general direction of the Slave 760 from the Master 750. As discussed above with reference to FIGS. 9, 10 and 11, the SBA 900 may be set to a selection of antenna beamwidths. A more complete understanding of the present embodiments, and the attendant advantages and features thereof, will be more readily understood by first describing an example method for the selection of the SBA 900 antenna beam(s) for the paging and temporary connection.

As discussed above with reference to FIG. 11, the SBA 900 may be set to wide beams of about 90 degrees, i.e., "quadrants". As an example, the SBA 900 may be initially set to quadrant 1101, and then the Master 750 starts the paging sequence. If a response is not heard with that quadrant selected, then after 2.56 seconds, the SBA 900 may be set to the next quadrant 1102 and the paging sequence started again. Assuming that the response is then heard, Master 750 will transmit the FHS packet as discussed above with reference to FIG. 6, step 3 603. Once the first POLL packet has been sent, step 5 605 in FIG. 6, then, as packets are exchanged during the temporary connection, individual SBA 900 antennas, corresponding to quadrant 1102, may be selected, in turn, and the corresponding signal strengths or correlations noted for each antenna.

Figure 13:
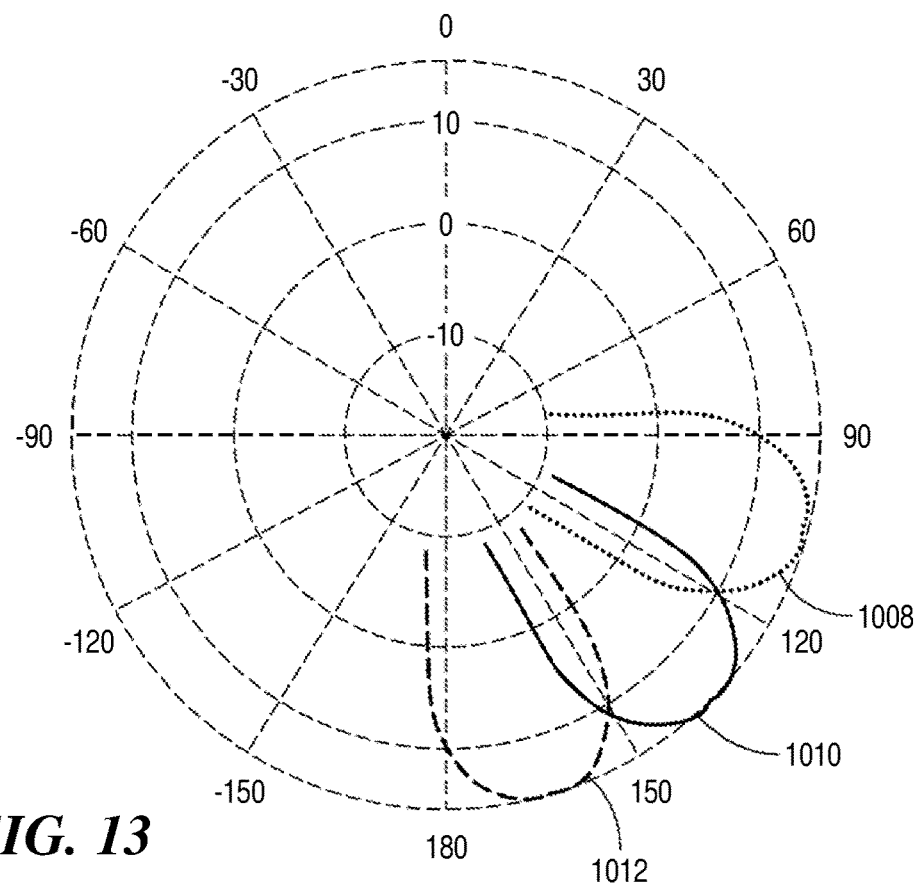
FIG. 13 is a diagram of an example of three individual beams that correspond to the wide beam quadrant.
Figure 14:
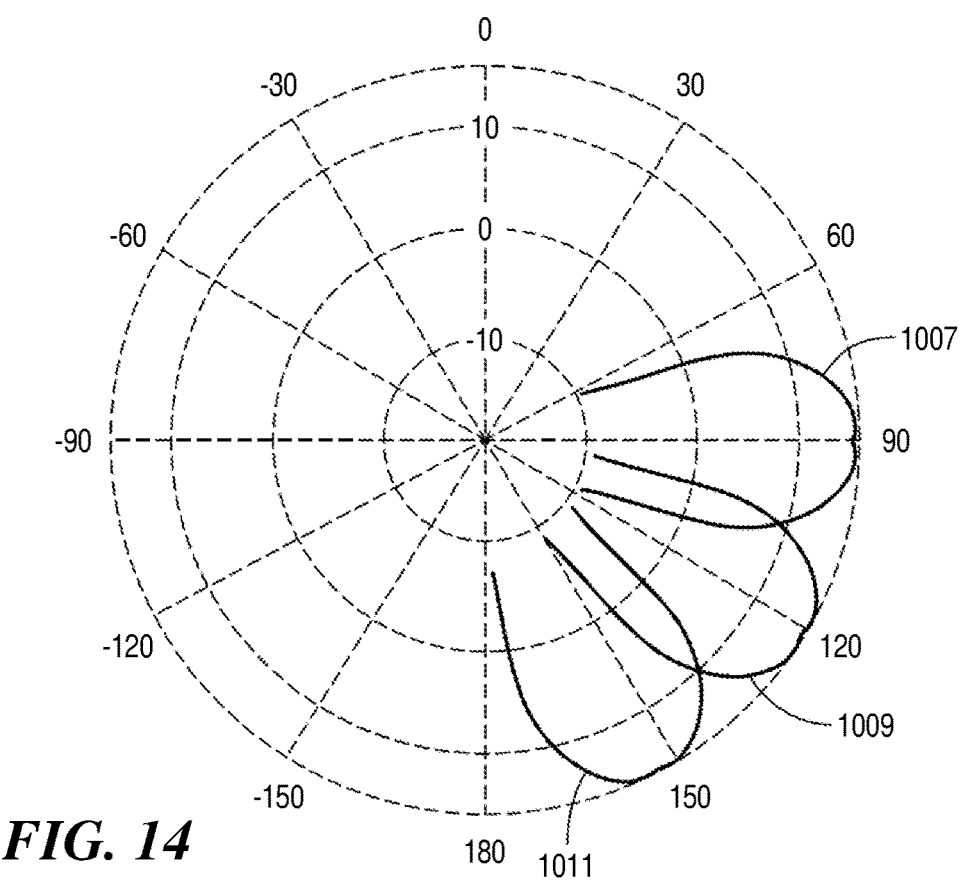
FIGS. 14 and 15 depict beams that may be selected.
Figure 15:
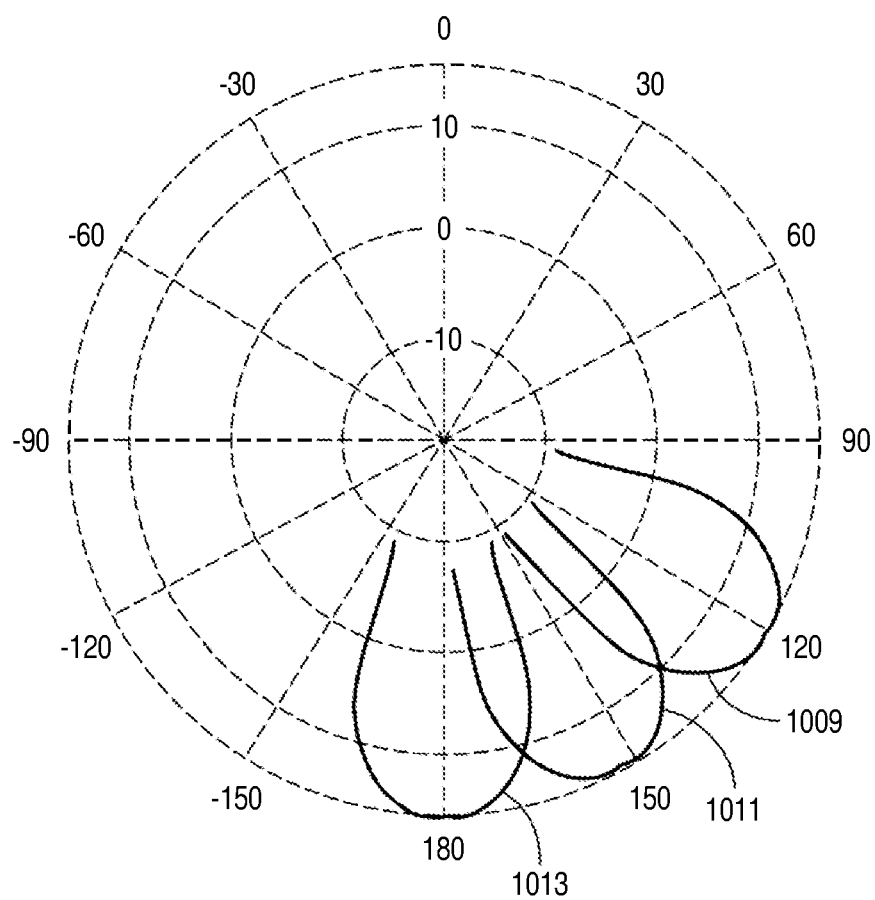

FIG. 13 is a diagram of an example of the three individual beams, 1008, 1010 and 1012 that correspond to quadrant 1102. In this example, the Master may select, in turn, beams 1008, 1010, 1012, dwelling for a set duration, Td, on each beam, noting the received signal strengths and calculating the average received signal strength per beam. After each sequence, i.e., a time of 3Td, the beam with the best average received signal strength may be noted. For example, assume that beam 1010 has the best average signal level, i.e., the center beam of the sequence. In this case, the Master 750 will continue to switch beams in the same sequence for the next time period of 3 Td. If, however, the beam with the highest average signal strength is, or becomes beam 1008, then Master 750 may then select, in turn, beams 1007, 1009,

1011, i.e., the beam sequence selection is shifted −15 degrees as depicted in FIG. 14 for the next 3Td time period. Similarly, if the beam with the highest average signal strength is, or becomes beam 1012, then the Master 750 may then select, in turn, beams 1009, 1011, 1013, i.e., the beam selection sequence is shifted +15 degrees, as depicted in FIG. 15. This selection sequence scheme of changing by zero, +15 or −15 degrees, continues until the temporary communication link is terminated. Continuing this example, if the highest average signal strength is, or then becomes beam 1013, then the Master 750 may then select, in turn, beams 1010, 1012, 1014, i.e., the beam sequence selection further shifted +15 degrees. By this example method, after each time period of 3Td, the beam with the maximum averaged signal strength is reported as the AOA corresponding to the direction of Slave 760 from Master 750.

The antenna selection sequence described above is −30, middle (0), +30 degrees, shifting plus or minus 15 degrees if the outer antennas have the better signal strength. Other selection sequences are possible. For example, the antenna selection sequence may be middle, −30, middle +30. This scheme however would output the AOA every 4Td and assumes that the middle antenna is the most likely selection. A scheme that switched between just two antennas is also possible but such a scheme may not find the best antenna in certain situations. The three antenna selection scheme described above is a preferred scheme.

Figure 9:
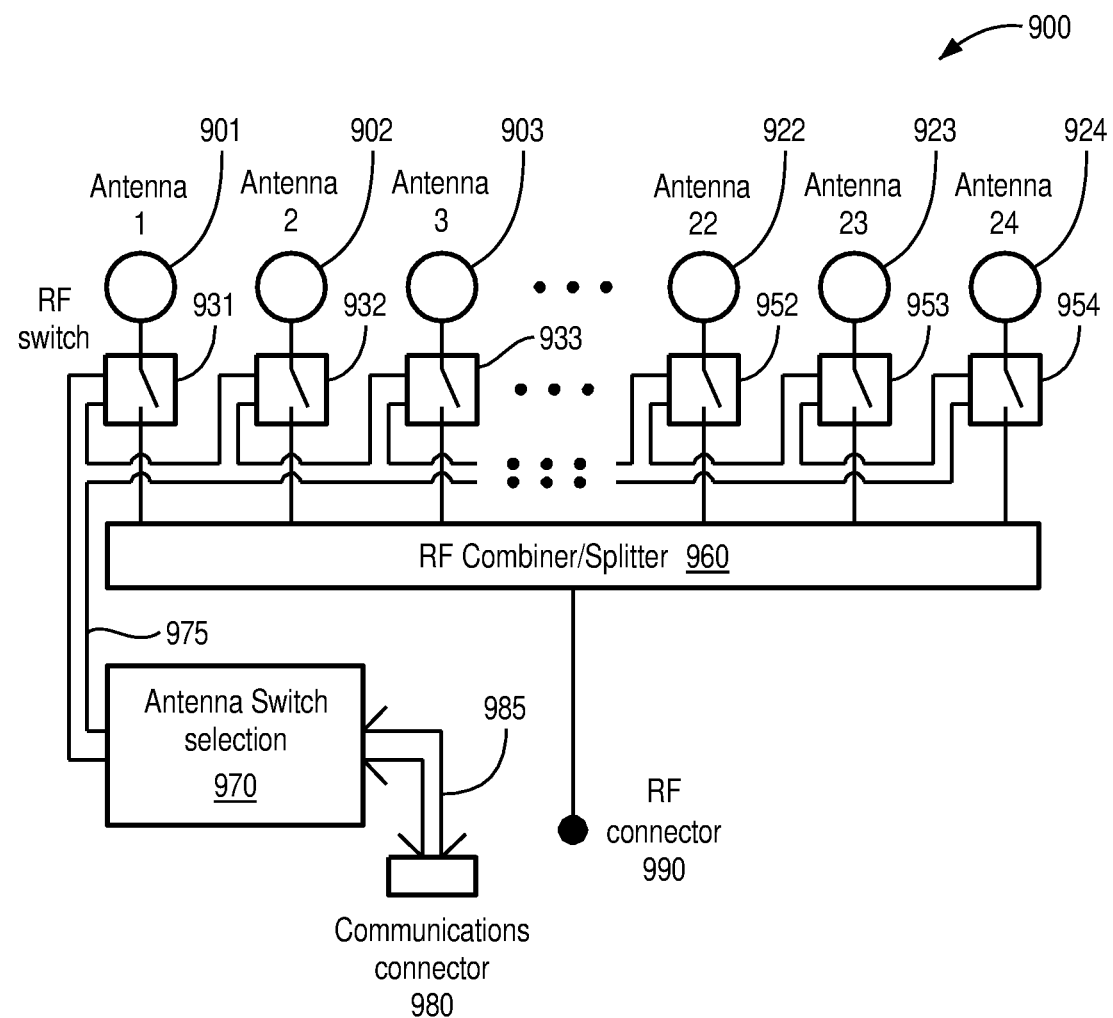
FIG. 9 is a block schematic diagram of an example of an SBA.
Figure 10:
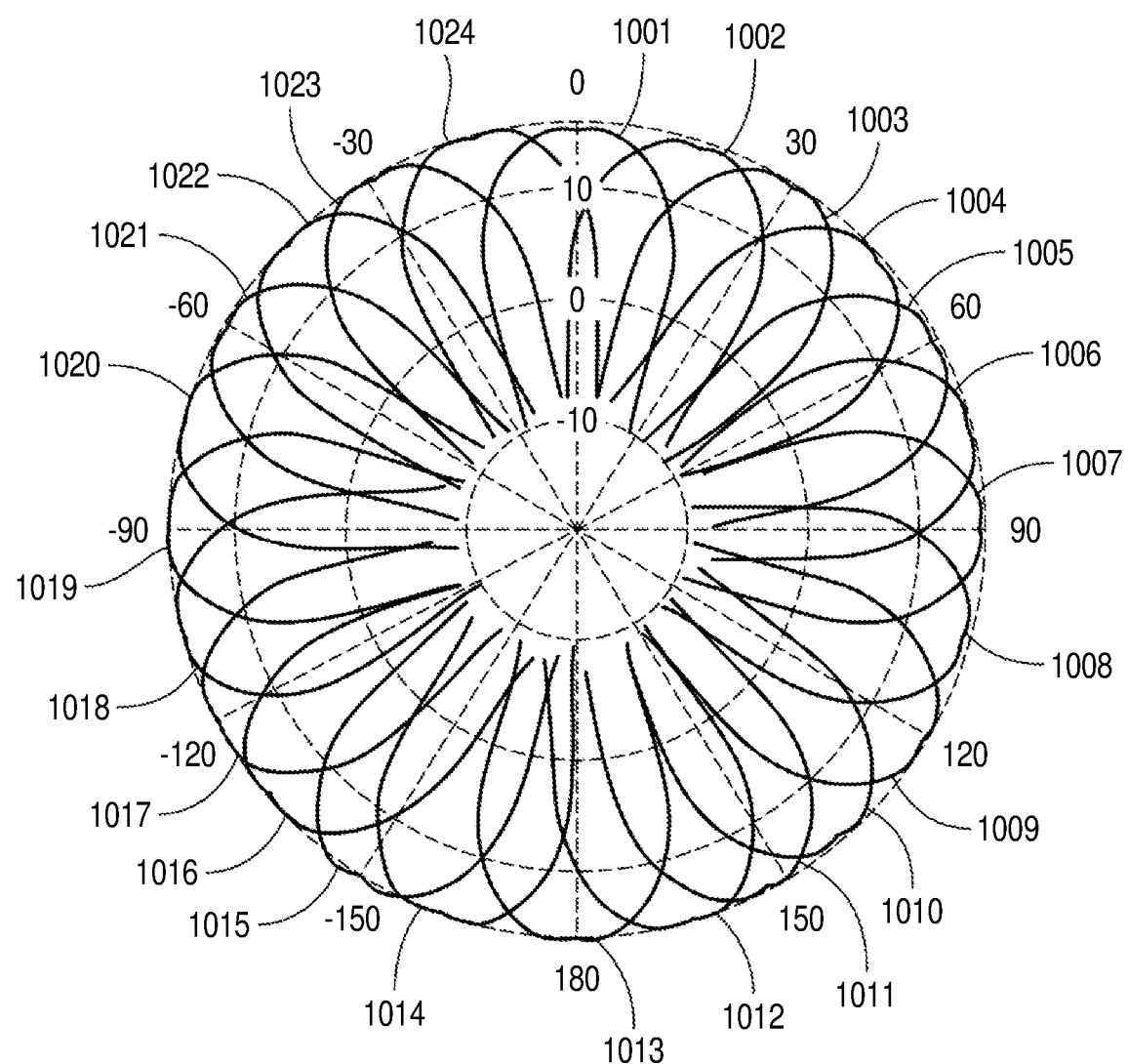
FIG. 10 is a diagram of an example the 24 individual beams corresponding to antennas when arranged in a circle, each beam at 15 degrees intervals.
Figure 11:
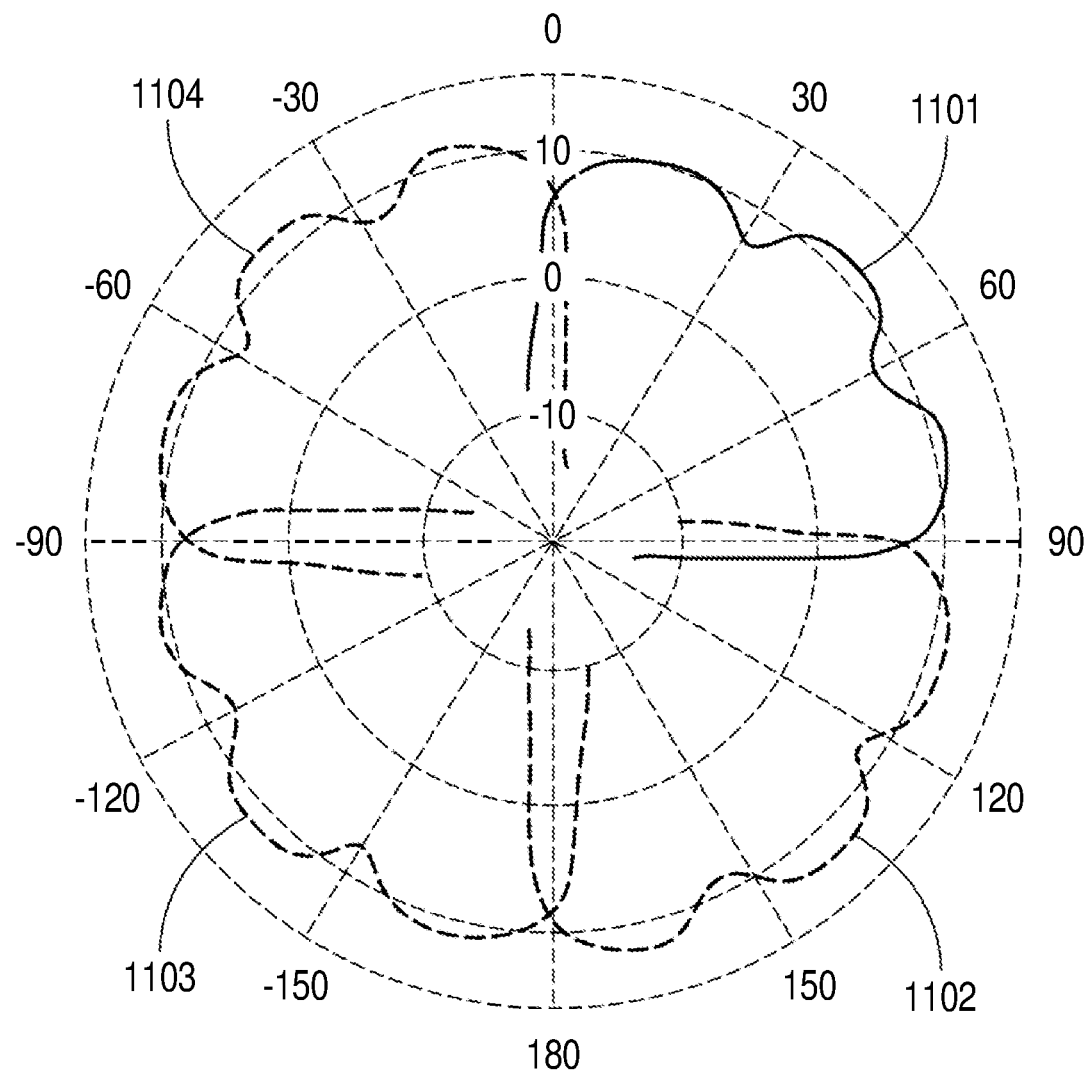
FIG. 11 is a diagram of an example of the beam resulting from a selection of antennas, producing a wide beam representing a beam of about 90 degrees width at a relative angle of 45 degrees.

The antenna selection sequence described above corresponds to example SBA 900 including 24 antennas as depicted in FIGS. 9 and 10. As will be appreciated by one of skill in the art, the details of the SBA, i.e., the number of antennas and the beamwidths, may vary, but the basic described antenna beam selection sequence may still apply. For example, wide beam widths may be selected until the paging response is received, and then the individual beams in that wide beam are selected, in turn. Then, based upon whether the middle or an outer antenna beam had the best received signal strength, the next selection of antenna is shifted. For example, if the SBA included say 12 antennas, then a wide beam formed by three adjacent antennas would be in the order of 90°. In this example, the antenna selection sequence is also −30, middle (0), +30 degrees, but shifting plus or minus 30 degrees if the outer antennas have the better signal strength.

The Bluetooth specification defines a link supervision timer, $T_{supervision}$ and a supervisionTO value. If at any time in the connection state, the $T_{supervision}$ reaches a the supervisionTO value, then the connection is considered to be disconnected. The default value for supervisionTO is 20 seconds but a value of 2 to 5 seconds may be generally used.

As described above, after each sequence of beam selection, i.e., after a time period of 3Td, the beam with the maximum averaged received signal strength is reported as the AOA. In the worst case, in the beam sequence described in the example above, there may be a time of 2Td when the signal is lost due to the selection of a beam. As long as Td is less than 1 second, then the connection will not cause a timeout. However, if signals are received on all three beams, then the connection may only last 200 ms and it is desirable that there are enough packets received to provide a valid average value. A packet may be received every 1.25 ms. Hence, a suitable value for Td may be in the order of 50 ms. During a 50 ms second connection time, there may be up to 40 packets received, which provides a reasonably valid averaged signal strength. There is, however, a finite time required to switch the beams, which may reduce the number of packets.

Figure 16:
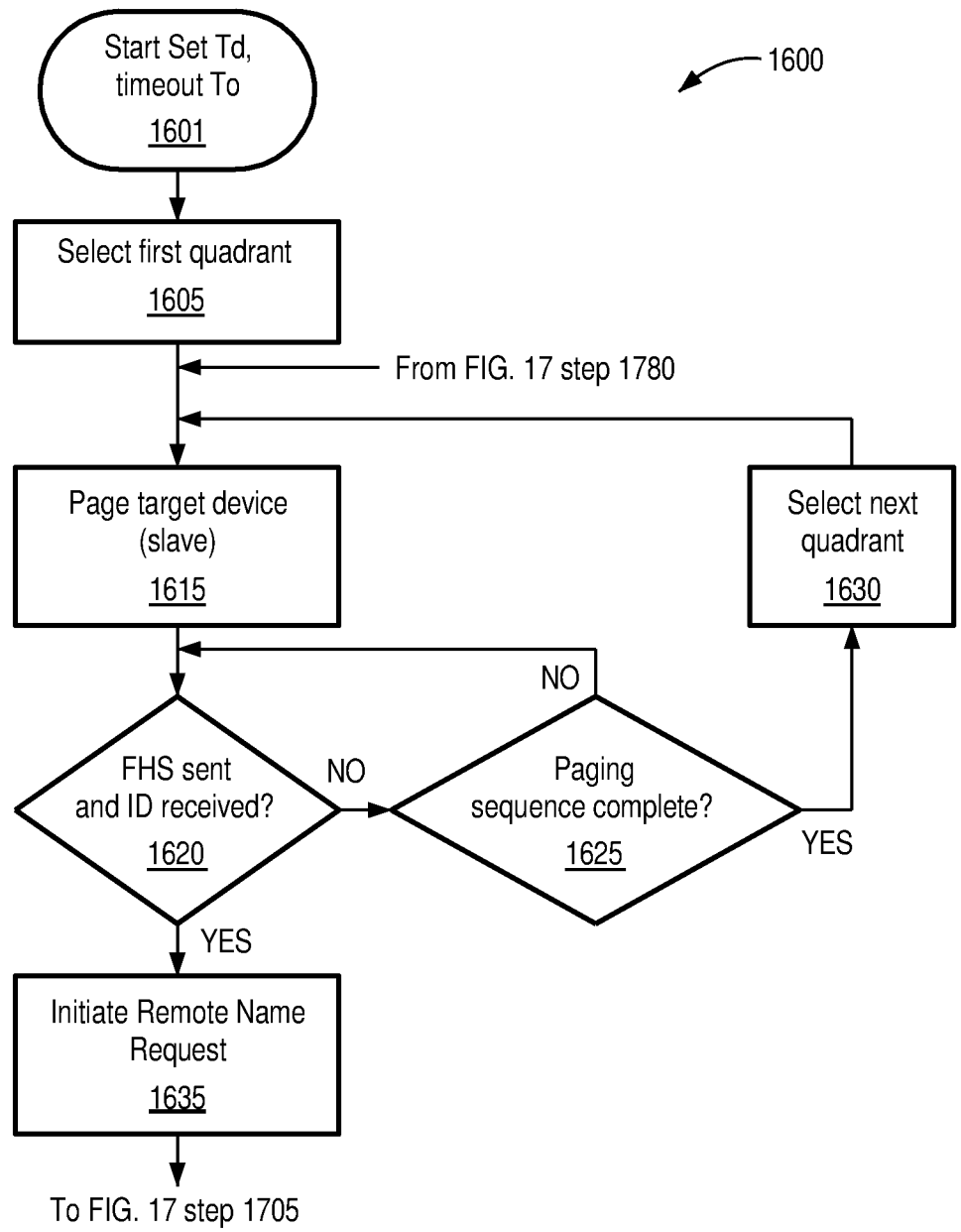
FIGS. 16 and 17 are a flow diagram of an example process of one embodiment of the disclosure for determining the AOA from a Bluetooth device, using an SBA.
Figure 17:
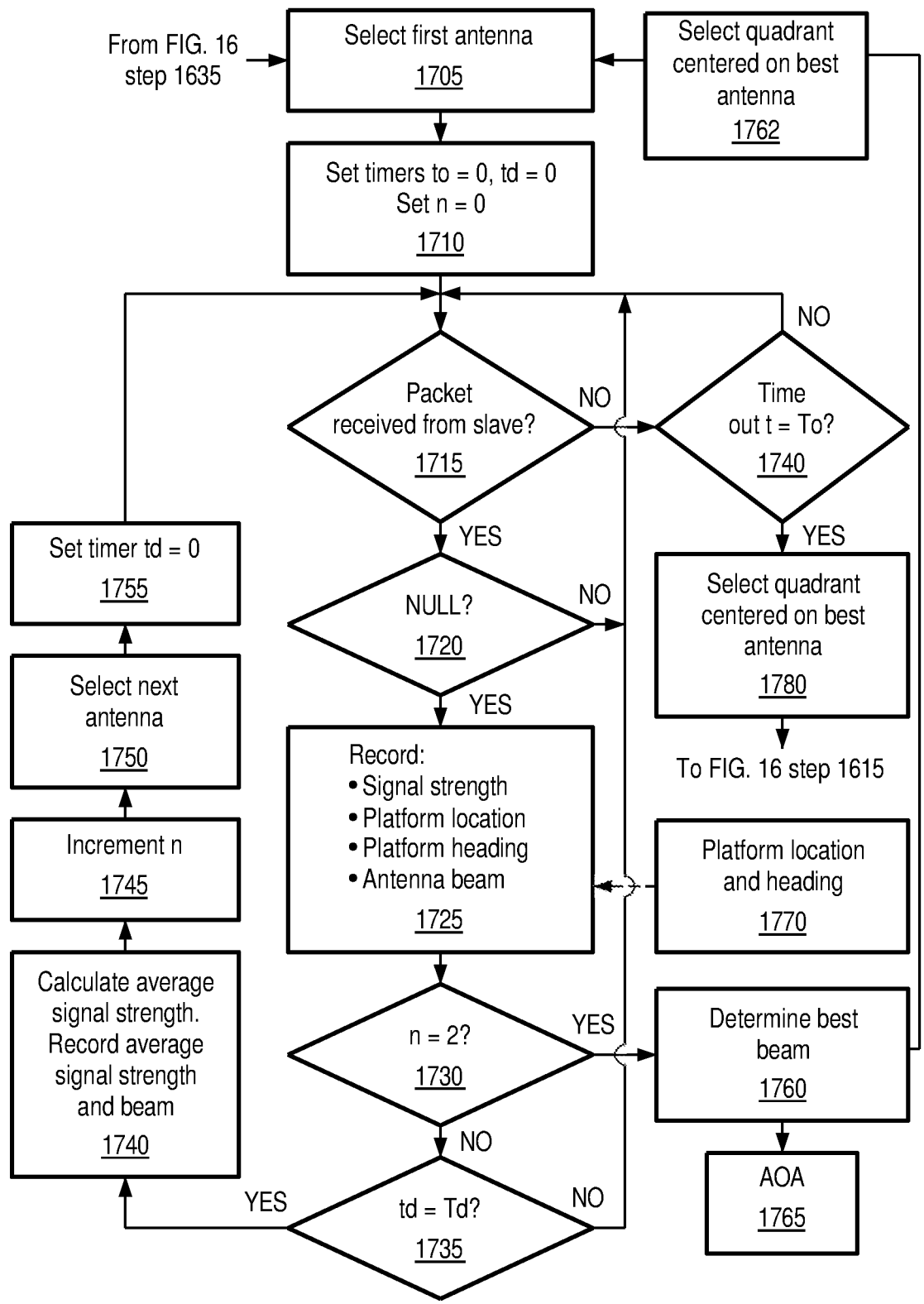

FIGS. 16 and 17 is a flow diagram of an example process 1600 of one embodiment of the disclosure for determining the AOA from a Bluetooth device using an SBA 900. Process 1600 may start with step 1601 where initial values for a number of parameters may be set. Such parameters may include a time duration for each beam selection, Td, and a timeout value, To, that determines if the temporary communication connection has been terminated. These values may be inputted by the user via general purpose processor 1250 providing the values to processing circuitry 1220 or may be preset via processing circuitry 1220. Example values for Td and To may be 50 milliseconds and 2 seconds, respectively.

At step 1605, an initial quadrant of the SBA 900 is selected, for example, quadrant 1101. Any quadrant or wide beam may be selected by selecting the appropriate adjacent RF switches, as discussed above with reference to FIG. 9. The quadrant may be selected via data bus 1270 and communications connector 980, controlled by processing circuitry 1220. At step 1615, the paging procedure is initiated, as discussed above with reference to FIG. 6. Wireless communication system 1200, acting as Master 750, may transmit the paging requests to Slave 760 via wireless transmitter/receiver 1210 and listen for the page response from Slave 760 on wireless transmitter/receiver 1210 and/or wireless receiver 1230, as discussed above with reference to FIG. 6 steps 1, 601 and 2, 602. At step 1620, it is determined whether the FHS packet has been transmitted and if the corresponding page response ID packet has been received, as discussed above with reference to FIG. 6 steps 3, 603, and 4, 604. The FHS, transmitted by wireless transmitter/receiver 1210 and page response packets may be detected by the wireless receiver 1230 and receiver 1214. Step 1625 checks whether the paging sequence has completed, i.e., the two 16 channel sequences have been transmitted and no FHS packet has been detected at step 1620. If at step 1625 the sequence has completed, then the next quadrant is selected at step 1630 and the process returns to step 1615. If, at step 1620, an FHS packet and the ID response are detected, then the process advances to step 1635 where, in order to keep the connection longer, the remote name request procedure may be started, as disclosed in U.S. Pat. No. 10,771,927 B1. The process then advances to FIG. 17 step 1705. The FHS packet may be transmitted by wireless transmitter/receiver 1210 and detected by wireless receiver 1230. The ID response packet may be received and detected by the wireless transmitter/receiver 1210 and/or wireless receiver 1230. If the ID response is at a low SNR and wireless receiver 1230 detects it using the correlator 1238, then wireless receiver 1230 may indicate to wireless transmitter/receiver 1210 that the ID has been received so that the sequence continues.

At step 1705, an initial antenna beam in the quadrant is selected as discussed above with reference to FIG. 13. For example, if at steps 1620 and 1635 quadrant 1102 was selected, then antenna beam 1010 may be initially selected at step 1705. At step 1710 timers to and td are initialized and a variable n is set to zero. The timer to may be used to determine if communication has ceased, i.e., timed out, timer td may be used to set the dwell time on each antenna beam, and variable n may be used to count the antenna beam selections. At step 1715 it is determined whether a packet has been received from Slave 760 and if so, at step 1720 it is determined if that packet was a NULL packet. If a NULL was detected, then at step 1725 various parameters related to that packet may be recorded. These parameters may include signal strength (or correlation value), the location and heading of the platform (i.e., the wireless communication system 1200), and which antenna beam is selected. The platform location and bearing may be provided by the platform location module 1260 and inputted, via data bus 1270, at step 1770. At step 1730, the value of variable n is checked. In this example, as discussed above with reference to FIGS. 13, 14 and 15, the antenna beam selection sequence includes the selection of three antenna beams, for example beams 1008, 1010, 1012. If at step 1730 n is less than 2, then at step 1735 the value of time td is checked. If td is less than Td, the antenna beam dwell time, then the process returns to step 1715.

Steps 1715, 1720 1725 and 1730 may be repeated until, at step 1735, timer td=Td. The process then advances to step 1740 where the set of parameters, recorded at step 1725, for packets received on the selected antenna beam, may be used to calculate, and record, the average signal strength of received packets over the time period Td. At step 1745 variable n is incremented, at step 1750 the next antenna beam is selected, and at step 1755, timer td is reset to zero. The process then returns to step 1715. Hence, the process for steps 1715, 1720, 1725, and 1735 is where packets are transmitted by wireless transmitter/receiver 1210 acting as Master 750, and packets are received from Slave 760 for a duration of Td with the parameters of the received packets being recorded at step 1725. After the duration of Td, determined at step 1735, the average signal level of all the received NULL packets, selected at step 1720, is calculated and stored at step 1740. This sequence is repeated three times, as the three antenna beams are, in turn, selected. The selection and timing of the antenna beams may be carried out by the general purpose processor 1250 via data bus 1270 and communications connector 980 of the SBA 900.

If, at step 1730, it is detected that n=2, then the sequence of selection of the three antenna beams, as discussed above with reference to FIG. 13, is complete and at step 1760, the best antenna beam, in terms of best signal strength, may be determined using the recorded data calculated in step 1740. The best antenna beam may then be inputted to step 1765 as the AOA of the Slave 760 for that location of the platform. After step 1760, at step 1762, the best beam determined at step 1760 is used as the center antenna beam for the next selected quadrant. For example, if the best antennas beam at step 1760 is beam 1009, then the selected quadrant will be that formed by combining beams 1011, 1009 and 1007 (as depicted in FIG. 14). If, however, the best antennas beam at step 1760 is beam 1011, then the selected quadrant would be that formed by combining beams 1013, 1011 and 1009 (as depicted in FIG. 15). The process may then return to step 1705 and continues, as described above, until, at step 1740, it is determined that no packets have been received from Slave 760 for a period of To and hence it is assumed that the communication link has terminated. The process then moves to step 1780.

At step 1780, the last best beam determined at step 1760 is used as the center antenna beam for the next selected quadrant, as described above with reference to step 1762. The process then returns to FIG. 6 step 1615 where a new paging sequence is initiated.

An AOA is outputted at step 1765 after every beam selection sequence, i.e., at intervals of 3Td, whilst the connection with the Slave 760 is maintained. Once the communication is terminated, as determined at step 1740, the quadrant centered on the last 'best beam' is selected and the process returns to paging. As discussed above, the average time between communication connections is in the order of 1.28 seconds with a worse-case of 2.56 seconds. If the wireless communications system 1200 is mobile, by choosing the quadrant with the best beam at step 1780, as long as the angle between the wireless communications system 1200 and the slave 760 changes by no more than 45 degrees during that gap in communications, then the new paging connection should occur on that quadrant. For example, if the wireless communications system 1200 is travelling at 40 mph, directly parallel to the Slave 760 at a distance of 100 feet, then the change in angle in 1.28 seconds is 37 degrees, i.e., less than the ±45 degree beamwidth of the quadrant.

The AOA reported at step 1765 is relative to the heading of the wireless communication system 1200. In the general sense, assuming that the wireless communication system 1200 is mounted in an automotive vehicle, then SBA 900 would be mounted, either internally or on the roof, with the zero degree beam 1001 in the forward direction of the vehicle. Then the AOA, relative to north, recorded at step 1765 would be the heading of the vehicle, as reported by the platform location module 1260, plus the SBA beam. If the vehicle, and therefore the wireless communications system 1200 makes turns, i.e., changes heading, then the selected beam of the SBA 900 must also be changed accordingly. This process of changing the beam selection commensurate with changing of heading must take place continuously. Hence, the vehicle heading, reported by the platform location module 1260 is continuously monitored and any changes are noted, and the selected beam(s) of the SBA 900 changed accordingly. For example, if the SBA beam was 30 degrees, 1003, and the vehicle heading was 45 degrees, then the direction or AOA of the slave 570 is at 75 degrees relative to north. If the vehicle heading then changed to −45 degrees, i.e., the vehicle took a 90 degree left hand turn, then the SBA 900 beam selection is changed by +90 degrees and the beam at 120 degrees 1009 would be selected such that the selected antenna beam is in the same direction as before the left hand turn.

The general purpose processor 1250 may include a display that indicates a vector showing the instantaneous direction of the Slave 570 relative to the wireless communications system 1200, i.e., the AOA outputted at step 1765 corrected by the heading.

A wireless communications system 1200 may be contained in vehicle with the SBA 900 mounted on or in the vehicle. When the vehicle is cornering, the heading, as may be reported by the platform location module 1260, will be changing. An estimation of the ability of the antenna selection for the AOA to be correct as the vehicle travels around a corner, follows.

The g force exerted on a vehicle travelling at a velocity of v around a corner of radius r is:

$$g \text{ force} = \frac{v^2}{r\,g} \quad (1)$$

The distance d travelled in completing the corner, 90°, is $$d = \frac{\pi\,r}{2} \quad (2)$$

And the time t to complete the corner, 90°, is $$t = \frac{d}{v} \quad (3)$$

The angular velocity V is therefore, $$V = \frac{90}{t} \quad (4)$$

With reference to FIGS. 16 and 17, the time T to complete the sequence of three antenna selections is 3 Td;

$$T = 3Td \quad (5)$$

In the time T to complete the antenna selection sequence, the vehicle will have changed its heading angle A, by, $$\Delta A = TV = \frac{180 \, v \, T}{\pi \, r} \quad (6)$$

This angle ΔA may be considered the "error angle" due to the cornering of vehicle.

A maximum 'comfortable' g force for a vehicle turning a corner is in the order of 0.2 g. Typical corner radii, r, may range from about 30 feet up to 150 feet for various roads. For a corner radius r of 50 feet, a vehicle would travel at a velocity v of 12 mph in order to exert a g force of 0.2, whereas for a corner radius r of 130 feet, a vehicle would travel at a velocity v of 20 mph. Assuming a value of Td=50 ms, from equation (4) the "worst-case" angular error, ΔA=4 degrees, for a vehicle cornering at g force 0.2 on a corner of radius 30 feet. For an SBA 900 that has 24 antennas, this angular error is well below the half bandwidth, 7.5 degrees, of the narrow beam antennas that are spaced at 15 degrees. In this example, the antenna selection and reported AOA will be accurate during the cornering of a vehicle that is carrying the wireless communications system 1200.

However, during the time that the paging packets are being sent, as described above with reference to FIG. 16, there may be time durations in the order of 1.28 seconds, up to a maximum of 2.56 seconds. In this case, the angular error will be in the order of 34 degrees, up to 68 degrees. Hence, in order to carry out steps 1605 to 1635, it is necessary to either shift the selected quadrant as the heading changes, or simply stop the process if the vehicle is sensed to be cornering.

Figure 18:
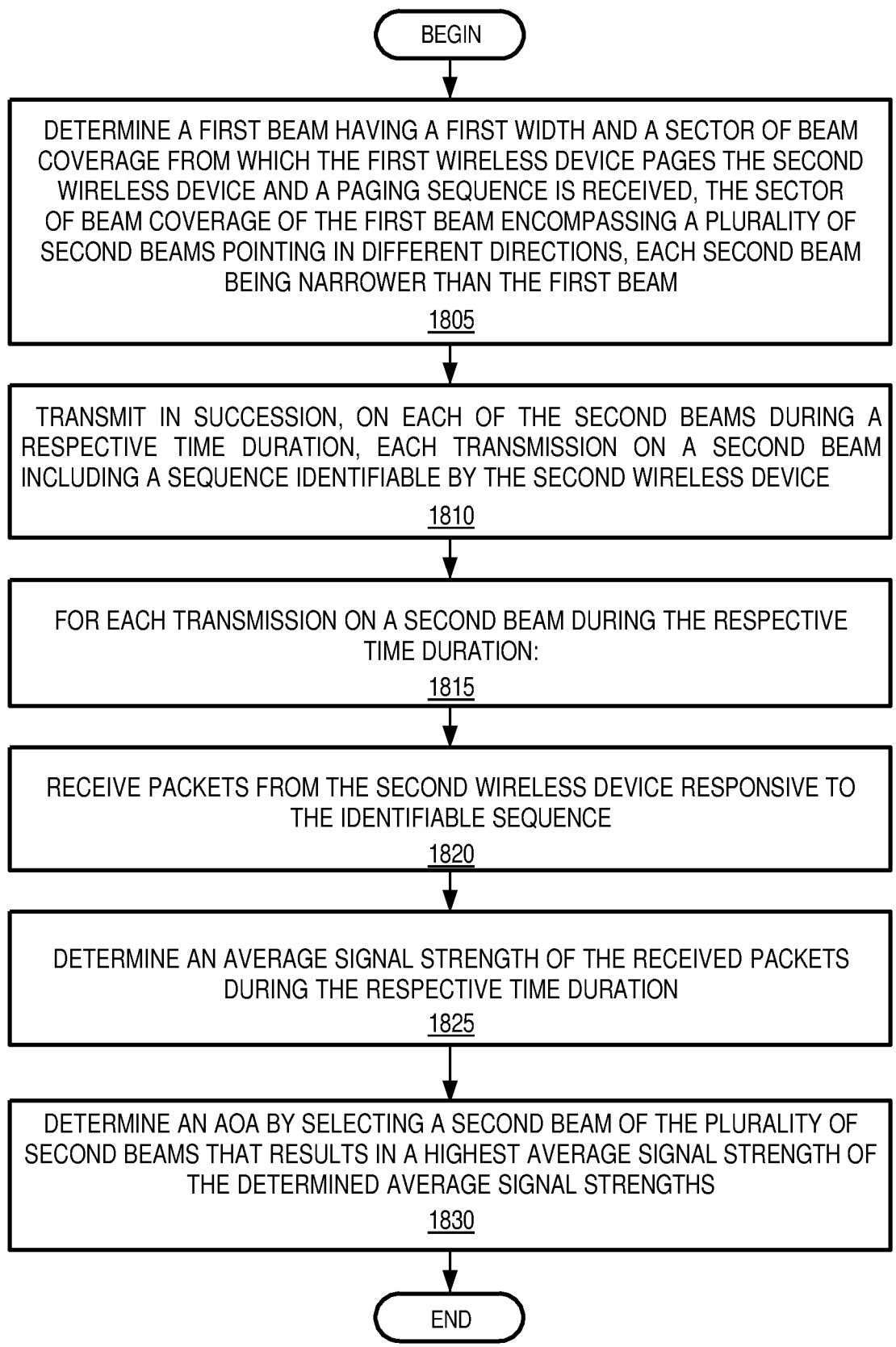
FIG. 18 is a flow diagram of another example process according to principles disclosed herein.

FIG. 18 is a flowchart of another example process for determining an AoA corresponding to communication between a first wireless device and a second wireless device. The process may be performed by a wireless transmitter/receiver 1210, including RF front end 1212, baseband unit 1218 and processing circuitry 1220. The process includes, at step 1805, determining a first beam having a first width and a sector of beam coverage from which the first wireless device pages the second wireless device and a paging sequence is received, the sector of beam coverage of the first beam encompassing a plurality of second beams pointing in different directions, each second beam being narrower than the first beam. The process also includes, at step 1810, transmitting in succession, on each of the second beams during a respective time duration, each transmission on the second beam including a sequence identifiable by the second wireless device. The process further includes for each transmission on a second beam during the respective time duration (step 1815): receiving packets from the second wireless device responsive to the identifiable sequence (step 1820); and determining an average signal strength of the received packets during the respective time duration (step 1825). The process also includes, at step 1830, determining an AoA by selecting a second beam of the plurality of second beams that results in a highest average signal strength of the determined average signal strengths.

In some embodiments, the process includes transmitting in succession, on a plurality of third beams obtained by shifting each second beam of the plurality of second beams in a same first direction. In some embodiments, each third beam of the plurality of third beams is shifted from a corresponding second beam by a same angle. In some embodiments, the angle and direction of each of the third beams are determined based at least in part on which second beam of the plurality of second beams results in the highest average signal strength. In some embodiments, when the second beam of the plurality of second beams resulting in a highest signal strength points in a first direction away from a center of the sector of beam coverage of the first beam, then shifting each second beam in the first direction to obtain a plurality of third beams. In some embodiments, the process includes successively transmitting on sets of third beams, each third beam of a set of third beams being shifted in a same direction from a corresponding beam of a previously set of beams, and determining a third beam of the successively sets of third beams resulting in a highest average signal strength of received packets. In some embodiments, the process includes selecting the first beam from a set of candidate beams, and transmitting on each candidate beam in sequence until a paging sequence is received from the second wireless device. In some embodiments, the process includes transmitting the selected first beam from a plurality of antennas and transmitting on each second beam of the plurality of second beams from a different one of the plurality of antennas. In some embodiments, the process includes transmitting on each one of the plurality of second beams using a different subset of antennas used to transmit the first beam. In some embodiments, the method includes algebraically adding the AoA to a heading of the SBA.

As will be appreciated by one of skill in the art, the details of the SBA, i.e., the number of antennas and the beamwidths, may vary, but the described antenna beam selection sequence still applies. For example, wide beam widths may be selected in turn, and then the individual beams in the wide beam that had the highest received signal strength are selected, in turn. If the antenna with the highest received signal strength is not the middle antenna, then the sequence shifts by one antenna in the same direction.

As will be also appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that may be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the details of the SBA beam switching sequence, the values of the timeout and beam dwell time, the number of beams and beamwidths of the SBA, the details of the wireless communications system with respect to number of receivers and details of the protocol analyzer. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method using a switched beam antenna (SBA) implemented in a first wireless device for determining an angle of arrival (AOA) corresponding to communication between the first wireless device and a second wireless device, the method comprising:
    determining a first beam having a first width and a sector of beam coverage from which the first wireless device pages the second wireless device and a paging sequence is received, the sector of beam coverage of the first beam encompassing a plurality of second beams pointing in different directions, each second beam being narrower than the first beam;
    transmitting in succession, on each of the second beams during a respective time duration, an identifiable sequence of first traffic packets;
    for each transmission on a second beam during the respective time duration:
        receiving a plurality of second traffic packets from the second wireless device in response to the identifiable sequence of the first traffic packets;
        recording a signal strength for each second traffic packet in the plurality of second traffic packets; and
        determining an average signal strength for the plurality of second traffic packets during the respective time duration; and
    determining an AOA by selecting a second beam from the plurality of second beams that results in a highest average signal strength of the determined average signal strengths.

2. The method of claim 1, further comprising:
    transmitting in succession, on each of a plurality of third beams obtained by shifting each second beam of the plurality of second beams in a same first direction.

3. The method of claim 2, wherein each third beam of the plurality of third beams is shifted from a corresponding second beam of the plurality of second beams by a same angle.

4. The method of claim 3, wherein an angle and a direction of each of the third beams are determined based at least in part on the second beam of the plurality of second beams resulting in the highest average signal strength.

5. The method of claim 2, further comprising:
    in response to the second beam of the plurality of second beams resulting in the highest average signal strength pointing in the first direction away from a center of the sector of beam coverage of the first beam, shifting each second beam of the plurality of second beams in the first direction to obtain the plurality of third beams.

6. The method of claim 5, further comprising:
    successively transmitting on sets of third beams, each third beam in a set of third beams being shifted in a same direction from a corresponding third beam of a previous set of third beams; and
    determining a third beam of the successive sets of third beams resulting in a highest average signal strength of received traffic packets.

7. The method of claim 1, further comprising:
    selecting the first beam from a set of candidate beams by transmitting on each candidate beam in sequence until the paging sequence is received from the second wireless device.

8. The method of claim 7, further comprising:
transmitting the first beam from a plurality of antennas, and
transmitting each second beam of the plurality of second beams from a different one of the plurality of antennas.

9. The method of claim 1, further comprising:
transmitting the first beam from a first subset of a plurality of antennas; and
transmitting each second beam of the plurality of second beams from a second subset of the plurality of antennas, the second subset being different from the first subset.

10. The method of claim 1, further comprising:
algebraically adding the AOA to a heading of the SBA.

11. The method of claim 1, wherein each of the first and second traffic packets is a poll packet or a null packet.

12. A switched beam antenna (SBA) implemented in a first wireless device, for determining an angle of arrival (AOA) corresponding to communication between the first wireless device and a second wireless device, the SBA comprising:
processing circuitry configured to determine a first beam having a first width and a sector of beam coverage from which the first wireless device pages the second wireless device and a paging sequence is received, the sector of beam coverage of the first beam encompassing a plurality of second beams pointing in different directions, each second beam being narrower than the first beam;
a radio interface in communication with the processing circuitry and configured to:
transmit in succession, on each of the second beams during a respective time duration, an identifiable sequence of first traffic packets; and
for each second beam transmission, receive a plurality of second traffic packets from the second wireless device in response to the identifiable sequence of the first traffic packets during the respective time duration; and
the processing circuitry being further configured to:
for each second beam transmission:
record a signal strength for each second traffic packet in the plurality of second traffic packets; and
determine an average signal strength for the plurality of second traffic packets during the respective time duration; and
determine an AOA by selecting a second beam from the plurality of second beams that results in a highest average signal strength of the determined average signal strengths.

13. The SBA of claim 12, wherein the radio interface is further configured to:
transmit in succession, on each of a plurality of third beams obtained by shifting each second beam of the plurality of second beams in a same first direction.

14. The SBA of claim 13, wherein each third beam of the plurality of third beams is shifted from a corresponding second beam of the plurality of second beams by a same angle.

15. The SBA of claim 14, wherein the processing circuitry is further configured to:
determine an angle and a direction of each of the third beams based at least in part on the second beam of the plurality of second beams resulting in the highest average signal strength.

16. The SBA of claim 13, wherein the processing circuitry is further configured to:
in response to the second beam of the plurality of second beams resulting in the highest signal strength pointing in the first direction away from a center of the sector of beam coverage of the first beam, shifting each second beam of the plurality of second beams in the first direction to obtain the plurality of third beams.

17. The SBA of claim 16, wherein the radio interface is further configured to:
successively transmit on sets of third beams, each third beam in a set of third beams being shifted in a same direction from a corresponding third beam of a previous set of third beams; and
determining a third beam of the successive sets of third beams resulting in a highest average signal strength of received traffic packets.

18. The SBA of claim 12, wherein the processing circuitry is further configured to:
select the first beam from a set of candidate beams, wherein the selection of the first beam includes transmitting, via the radio interface, on each candidate beam in sequence until the paging sequence is received from the second wireless device.

19. The SBA of claim 18, wherein radio interface is further configured to:
transmit the first beam from a plurality of antennas, and
transmit each second beam of the plurality of second beams from a different one of the plurality of antennas.

20. The SBA of claim 12, wherein the radio interface is further configured to:
transmit the first beam from a first subset of a plurality of antennas; and
transmit each second beam of the plurality of second beams from a second subset of the plurality of antennas, the second subset being different from the first subset.

21. The SBA of claim 12, wherein the processing circuitry is further configured to algebraically add the AOA to a heading of the SBA.

22. The SBA of claim 12, wherein each of the first and second traffic packets is a poll packet or a null packet.

* * * * *